(12) United States Patent
Agarwal et al.

(10) Patent No.: US 8,958,285 B2
(45) Date of Patent: *Feb. 17, 2015

(54) NETWORK DISRUPTION PREVENTION WHEN VIRTUAL CHASSIS SYSTEM UNDERGOES SPLITS AND MERGES

(71) Applicant: Juniper Networks, Inc., Sunnyvale, CA (US)

(72) Inventors: Saurabh Agarwal, Fremont, CA (US); Rajashekar Reddy, San Jose, CA (US); Harshad Nakil, San Jose, CA (US); Megh Bhatt, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 161 days.

This patent is subject to a terminal disclaimer.

(21) Appl. No.: 13/745,372

(22) Filed: Jan. 18, 2013

(65) Prior Publication Data

US 2013/0132763 A1 May 23, 2013

Related U.S. Application Data

(63) Continuation of application No. 12/640,667, filed on Dec. 17, 2009, now Pat. No. 8,369,211.

(51) Int. Cl.
*G01R 31/08* (2006.01)
*G06F 11/20* (2006.01)
*H04L 12/24* (2006.01)
*H04L 29/14* (2006.01)

(52) U.S. Cl.
CPC ........ *G06F 11/2002* (2013.01); *H04L 41/0677* (2013.01); *H04L 41/0893* (2013.01); *H04L 69/40* (2013.01)

USPC ........................... 370/221; 370/244; 370/255

(58) Field of Classification Search
USPC ........................................ 370/221, 244, 255
See application file for complete search history.

(56) References Cited

U.S. PATENT DOCUMENTS

| 8,369,211 B2* | 2/2013 | Agarwal et al. ............... 370/221 |
| 2005/0281191 A1* | 12/2005 | McGee et al. ............... 370/216 |
| 2006/0092853 A1 | 5/2006 | Santoso et al. |
| 2009/0086620 A1 | 4/2009 | Fowler et al. |
| 2009/0129398 A1 | 5/2009 | Riegel et al. |
| 2009/0135715 A1 | 5/2009 | Bennah et al. |
| 2009/0175281 A1* | 7/2009 | Higuchi et al. ............... 370/401 |
| 2011/0149743 A1 | 6/2011 | Agarwal et al. |

* cited by examiner

*Primary Examiner* — Jason Mattis
(74) *Attorney, Agent, or Firm* — Harrity & Harrity, LLP

(57) ABSTRACT

A method performed by network devices that includes operating in a normal mode, where the network devices form a virtual chassis that corresponds to a single logical network device; detecting when a failure within the virtual chassis occurs; executing a splitting process to form one or more new virtual chassis in correspondence to the failure; determining whether one of the one or more new virtual chassis operates as a functioning virtual chassis based on whether at least one of a set of criteria is satisfied, where the functioning virtual chassis operates according to resources configured for the virtual chassis; and operating as a nonfunctioning virtual chassis when it is determined that the one of the one or more virtual chassis does not satisfy the at least one of the set of criteria, where the nonfunctioning virtual chassis operates in a pass-through mode.

20 Claims, 14 Drawing Sheets

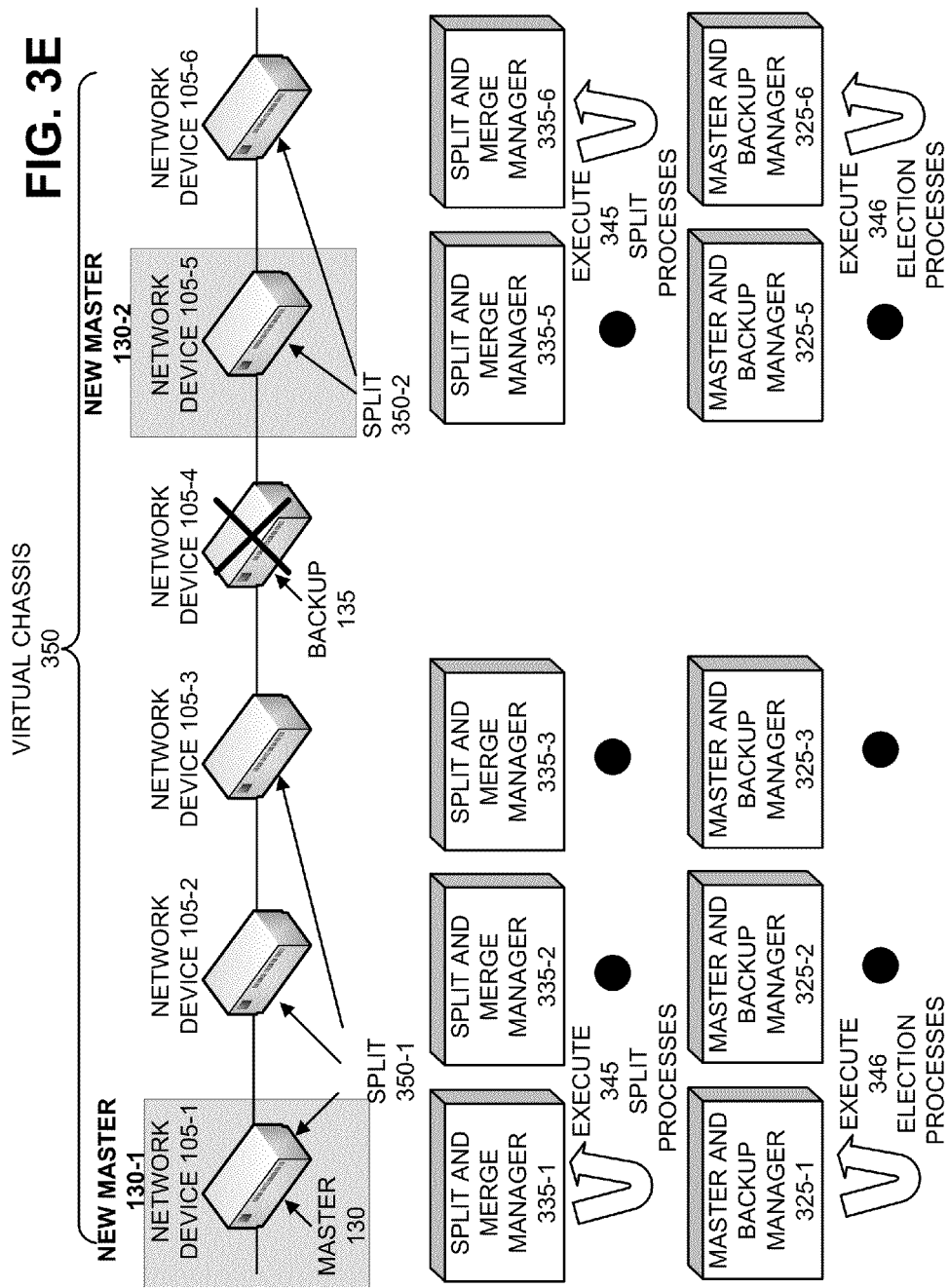

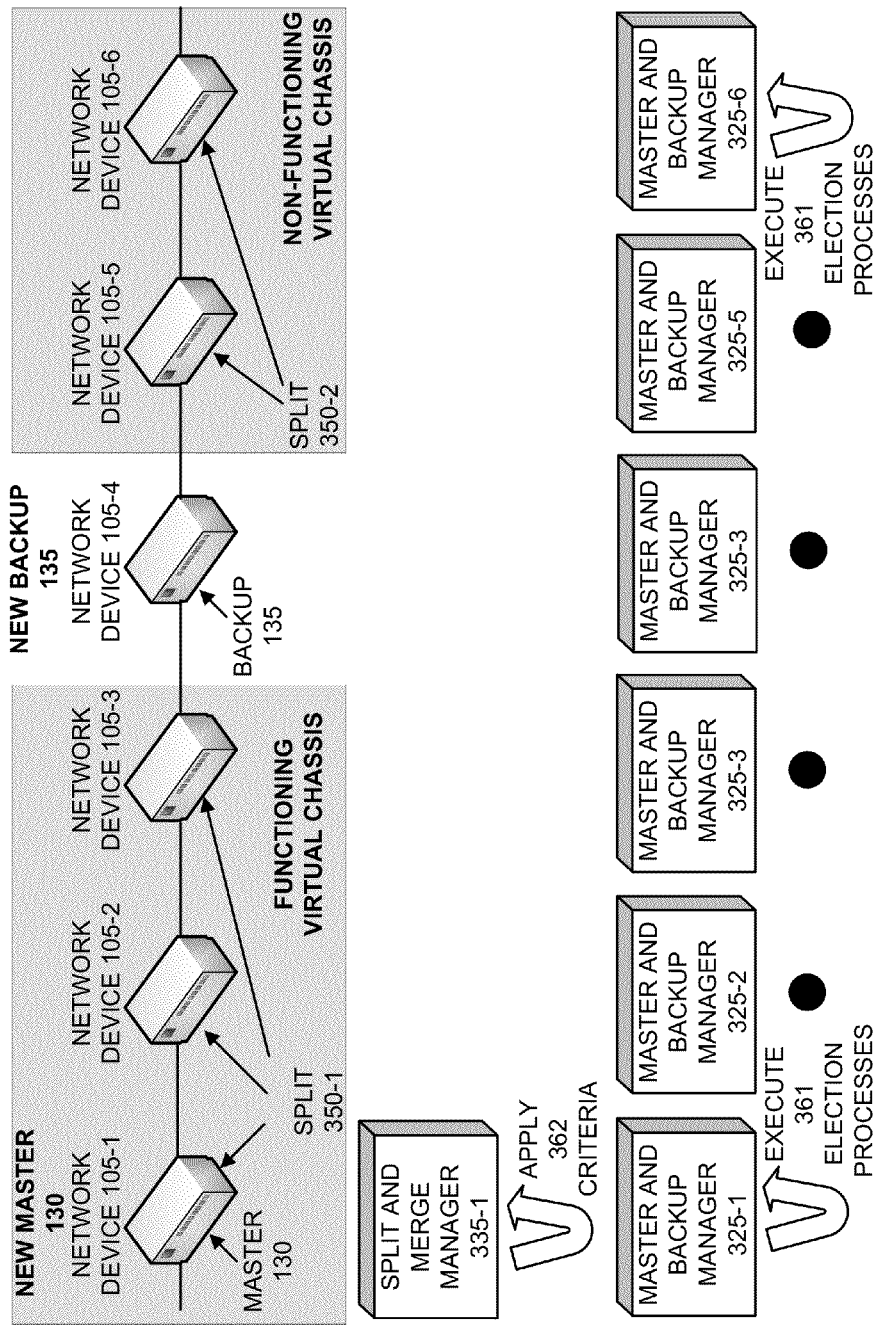

NETWORK DISRUPTION PREVENTION WHEN VIRTUAL CHASSIS SYSTEM UNDERGOES SPLITS AND MERGES

RELATED APPLICATION

This application is a continuation of U.S. patent application Ser. No. 12/640,667, filed Dec. 17, 2009, the disclosure of which is incorporated herein by reference.

BACKGROUND

In a network environment, a virtual chassis may be implemented by allowing a group (e.g., two or more) of routers or switches to behave as a single router or a single switch. In this type of network environment, the group of routers or switches may be grouped or connected together using cables. In order for the routers or switches to communicate with one another, each router or each switch needs to be up and running (versus being down due to a failure). That is, if one of the routers or one of the switches crashes, then routers or switches on one side of the crashed router or the crashed switch will lose connectivity to the other routers or to the other switches connected on the other side of the crashed router or the crashed switch. In such instances, this results in a split. If a split occurs each section of the split may function as a separate virtual chassis. However, this may cause disruptions to the network. For example, if the two separate virtual chassis share the same IP address (e.g., originally assigned to the virtual chassis before splitting) and/or other user configuration resources, network disruptions may occur. Additionally, the split virtual chassis may subsequently undergo further splits, or may merge back together, which may also cause network disruptions.

SUMMARY

In accordance with one embodiment, a method may include operating, by network devices, in a normal mode, where the network devices form a virtual chassis that corresponds to a single logical network device; and detecting, by one or more of the network devices, when a failure within the virtual chassis occurs. The method may further include executing, by the network devices, a splitting process to form one or more new virtual chassis in correspondence to the failure; and determining, by the network devices, whether one of the one or more new virtual chassis operates as a functioning virtual chassis based on whether at least one criterion of a set of criteria is satisfied, where the functioning virtual chassis operates according to resources configured for the virtual chassis. The method may also include operating, by the network devices, as a nonfunctioning virtual chassis when it is determined that the one of the one or more virtual chassis does not satisfy the at least one criterion of the set of criteria, where the nonfunctioning virtual chassis operates in a pass-through mode.

In accordance with a further exemplary embodiment, a network device may include logic to: operate within a virtual chassis, where the virtual chassis corresponds to network devices that operate as a single logical network device; detect a failure within the virtual chassis; execute a splitting process to form one or more new virtual chassis in correspondence to the detected failure; and determine whether one of the one or more new virtual chassis satisfies at least one criterion of a set of criteria, the set of criteria providing whether the one of the one or more new virtual chassis operates as a functioning virtual chassis, where the functioning virtual chassis operates according to a configuration associated with the virtual chassis.

In accordance with another exemplary embodiment, a computer-readable medium containing instructions executable by at least one processor may store instructions for: forming a virtual chassis in which multiple network devices operate as a single logical network device; executing a split of the virtual chassis when a failure within the virtual chassis occurs, where a result of the split forms a new virtual chassis; and determining whether the new virtual chassis operates as a functioning virtual chassis according to a configuration associated with the virtual chassis or operates as a nonfunctioning virtual chassis in which one or more network devices operate in a pass-through mode.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 3C-3H are diagrams illustrating exemplary processes associated with the exemplary functional components illustrated in FIG. 3B and described herein;

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims and equivalents.

Implementations described herein provide for methods, devices, and computer-readable media that manage splits and merges associated with a virtual chassis. In an exemplary implementation, network devices associated with a split portion may determine whether it may operate as a functioning virtual chassis or a nonfunctioning virtual chassis. A functioning virtual chassis may include one or more network devices that operate according to a configuration associated with the original virtual chassis. A nonfunctioning virtual chassis may include one or more network devices that operate in a pass-through mode. For example, a network device in pass-through mode may simply receive packets at an input and output those packets at an output. In this way, network disruptions caused by two or more virtual chassis that share the same global resources (e.g., network addresses) and global configurations may be avoided. That is, only one functioning virtual chassis may exist.

In an exemplary implementation, the following criteria may be applied: (1) if a split portion includes both a master device and a backup device; (2) if a split portion includes a master device and a size of the split portion is more than half a maximum size of the virtual chassis; or (3) if the split portion includes a backup device and a size of the split portion is at least half the maximum size of the virtual chassis. In the instance that a split portion satisfies at least one of these criteria, the split portion may operate as a functioning virtual chassis. Otherwise, the split portion may operate as a nonfunctioning virtual chassis.

Similarly, when split portions attempt to merge, the same criteria may be applied to determine whether the merged split portions may operate as a functioning virtual chassis or a nonfunctioning virtual chassis.

Figure 1A:
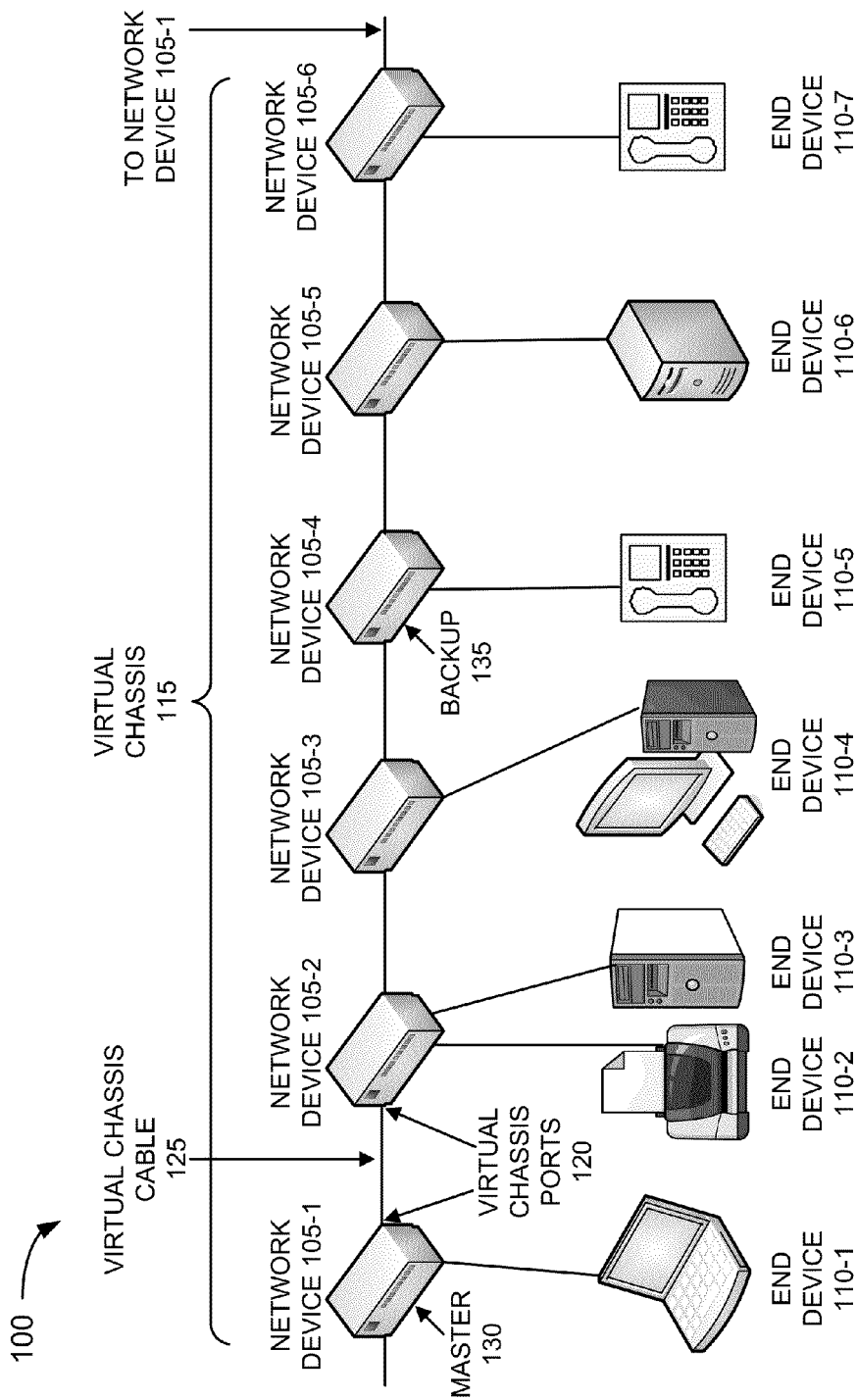
FIGS. 1A-1C are diagrams illustrating an overview of an exemplary implementation for preventing network disruption when a split occurs in a virtual chassis.
Figure 1B:
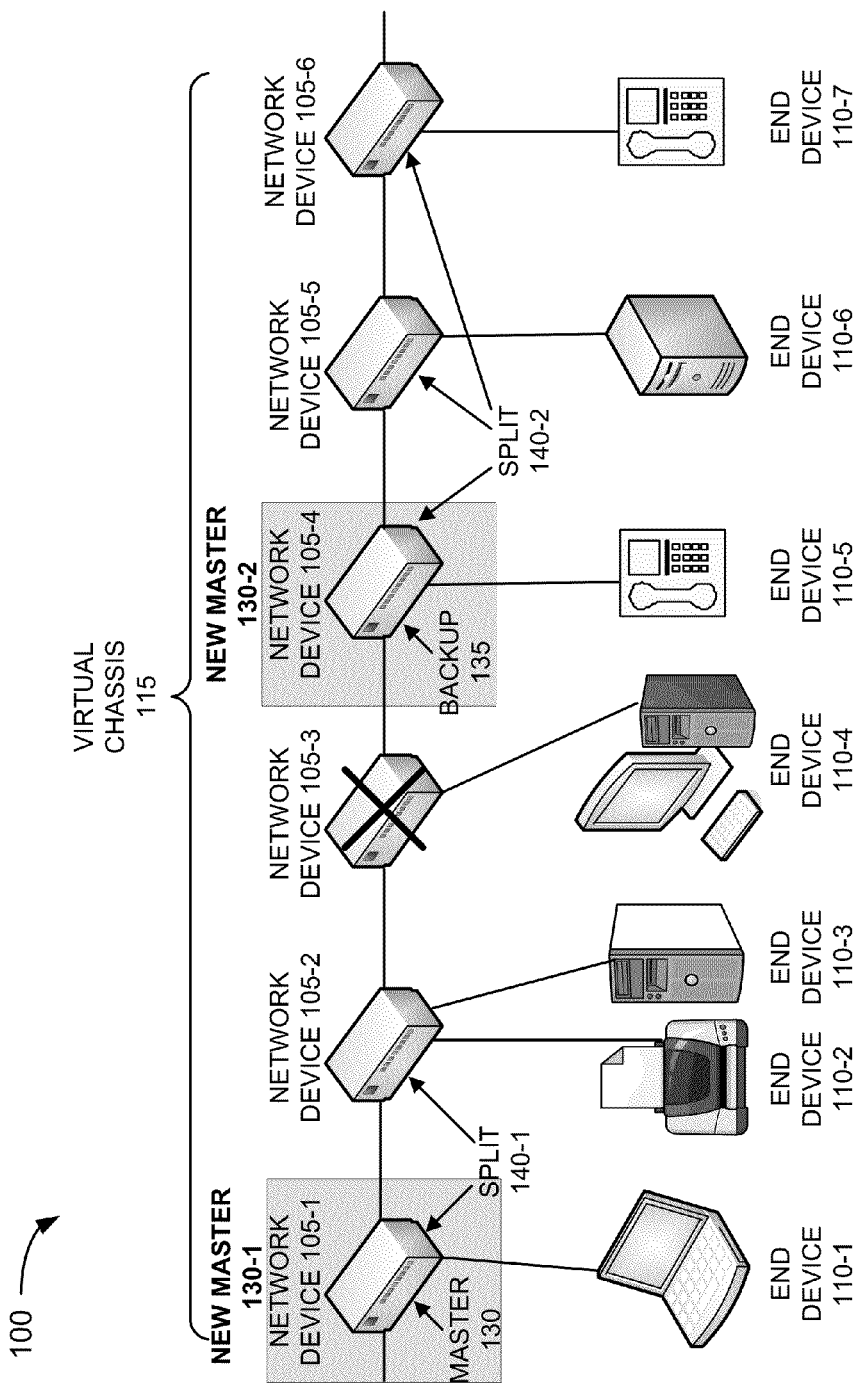
Figure 1C:
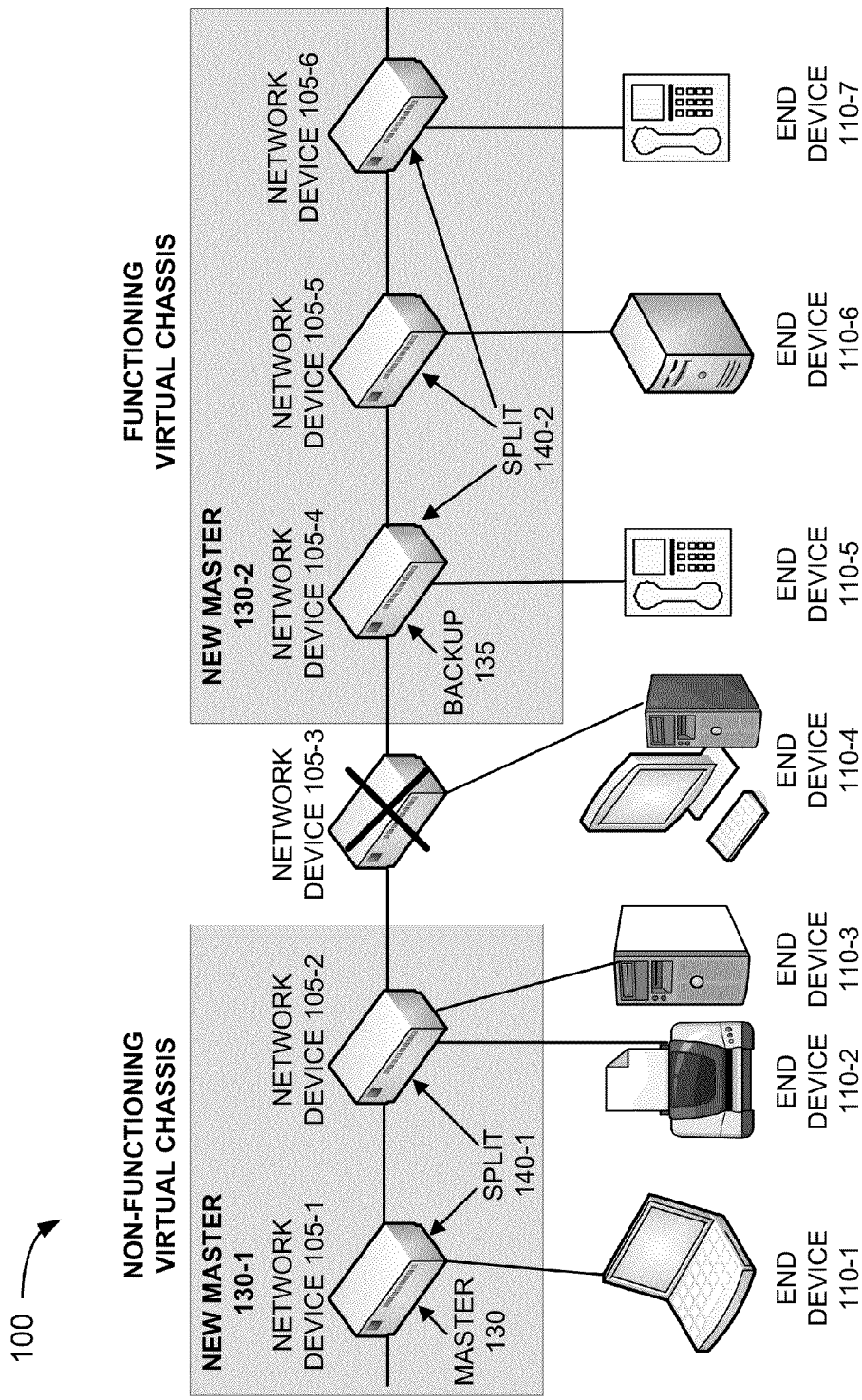

FIGS. 1A-1C are diagrams illustrating an overview of an exemplary implementation for preventing network disruption when a split occurs in a virtual chassis. By way of example, an exemplary environment 100 may include network devices 105-1 through 105-6 (referred to generally as network devices 105 or network device 105) and end devices 110-1 through 110-7 (referred to generally as end devices 110 or end device 110). The group of network devices 105 may be considered a virtual chassis 115. Each network device 105 may include virtual chassis ports 120 which permit network device 105 to interconnect with another network device 105 via a virtual chassis cable 125. For example, in a ring configuration, network device 105-6 may be interconnected to network device 105-5 and network device 105-1. Virtual chassis 115 may permit network devices 105 to interconnect to create a single logical device. In an exemplary implementation, all of network devices 105 may be managed as a single network device 105.

The number of network devices and configuration in environment 100 is exemplary and provided for simplicity. In practice, environment 100 may include more network devices, fewer network devices, different network devices, and/or differently arranged network devices than those illustrated in FIG. 1A. For example, while FIG. 1A illustrates six network devices 105, environment 100 may include more than or fewer than six network devices 105. Environment 100 may include wired and/or wireless connections among network devices 105.

Network device 105 may include a device having the capability to communicate with other devices, systems, networks, and/or the like. For example, network device 105 may correspond to a router, a switch (e.g., an Ethernet switch), a network device that provides layer 2 functionality, a network device that provides layer 3 functionality, and/or some other type of communication device that may receive, process, and/or transmit packets. The term "packet," as used herein, may refer to, for example, a packet, a datagram, a frame, or a cell; a fragment of a packet, a fragment of a datagram, a fragment of a frame, a fragment of a cell; or another type or arrangement of data or packaging of data. Network devices 105 may connect to various end devices 110.

End device 110 may include a device having the capability to communicate with other devices, systems, networks, and/ or the like. For example, end device 110 may include a computer (e.g., a laptop, a desktop), a printer, a server, a telephone, or some other type of user device.

Referring to FIG. 1A, in an exemplary operation, assume that network devices 105 are operating in a normal mode, where packets may be received, processed, and transmitted. Further assume that network device 105-1 may be designated as a master device 130 (e.g., according to a master election process), and network device 105-4 may be designated as a backup device 135 (e.g., according to a backup election process).

Referring to FIG. 1B, assume that network device 105-3 crashes (illustrated as an X) causing a split to occur. Network devices 105 may detect a topology change associated with the failure of network device 105-3. As a result, a split 140-1 and a split 140-2 (referred to generally as splits 140 or split 140) may be formed. For example, split 140-1 may include network devices 105-1 and 105-2, and split 140-2 may include network devices 105-4, 105-5, and 105-6.

In an exemplary implementation, splits 140 may execute a master election process to select a new master device 130. For example, network device 105-1 may be elected as new master 130-1 for split 140-1 and network device 105-4 may be elected new master 130-2 for split 140-2. Split 140-1 and split 140-2 may each determine whether it may operate as a functioning virtual chassis. For example, new masters 130-1 and 130-2 may each determine, on behalf of splits 140-1 and 140-2, whether it may operate as a functioning virtual chassis. It will be appreciated that only one, if any, may operate as the functioning virtual chassis.

In an exemplary implementation, one of splits 140 may operate as the functioning virtual chassis if at least one of the following criteria are met. Master device 130 and backup device 135 referred to in the following criteria refers to master device 130 and backup device 135 that were designated in virtual chassis 115 before the split. The criteria may include (1) if split 140 includes both master device 130 and backup device 135; (2) if split 140 includes master device 130 and a size of split 140 is more than half a maximum size of virtual chassis 115; or (3) if split 140 includes backup device 135 and a size of split 140 is at least half the maximum size of virtual chassis 115.

As illustrated in FIG. 1B, split 140-2 satisfies criterion (3) since split 140-2 includes network 105-4, which is designated as backup device 135 (in original virtual chassis 115 before the split), and split 140-2 include at least half the maximum size of virtual circuit 115 (i.e., maximum size of virtual chassis 115 is six) and split 140-2 includes three network devices 105 (i.e., network devices 105-4, 105-5 and 105-6). Therefore, in this example, split 140-2 may operate as the functioning virtual chassis and split 140-1 may operate as the nonfunctioning virtual circuit, as illustrated in FIG. 1C. When a split 140 operates as the nonfunctioning virtual chassis, it may operate in a pass-through mode (e.g., packets received at input are transmitted via an output).

As a result of the foregoing, more than one split 140 of a virtual chassis 115 may not operate as a functioning virtual chassis at one time and so the same configuration may not be operating on different splits 140. In this way, network disruptions may be prevented. Since an exemplary implementation has been broadly described, variations may exist. For example, an exemplary implementation may include when splits 140 merge together to form virtual chassis 115. Accordingly, a detailed description of exemplary implementations is provided below.

Exemplary Network Device Architecture

Figure 2:
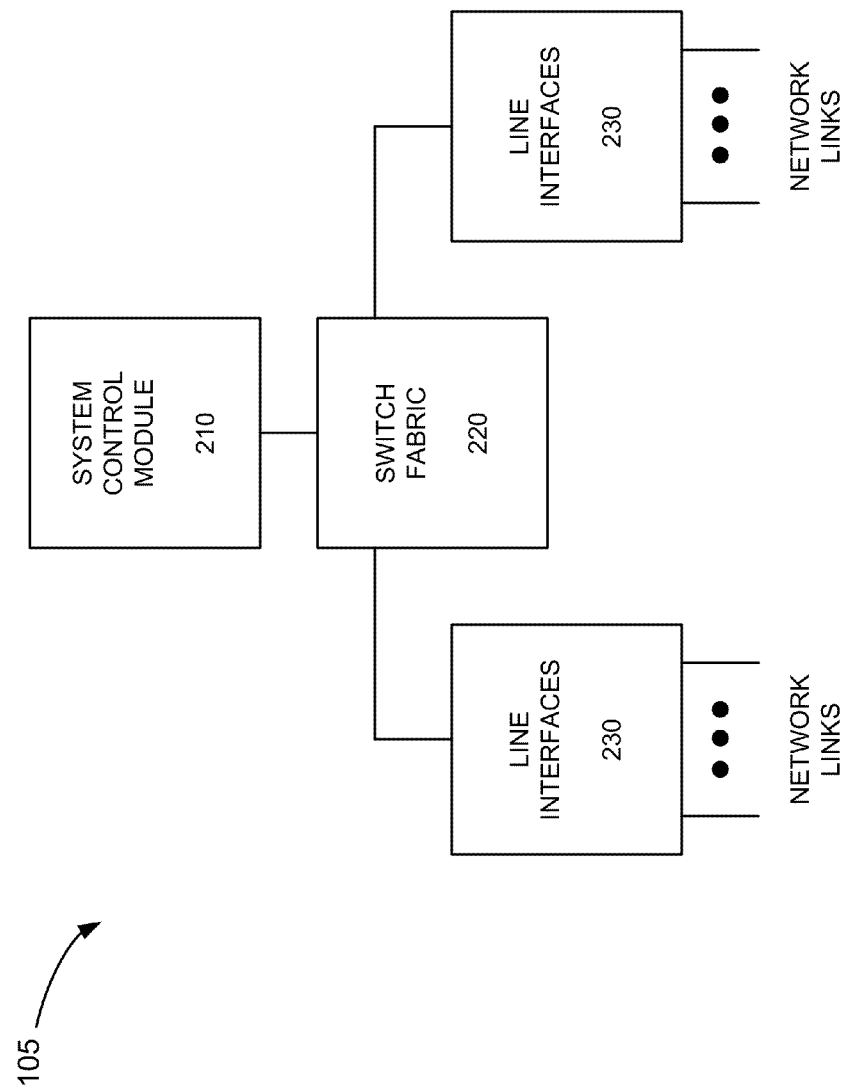
FIG. 2 is a diagram illustrating exemplary components of a network device depicted in FIGS. 1A-1C.

FIG. 2 is a diagram illustrating exemplary components of network device 105. As illustrated in FIG. 2, network device 105 may include, for example, a system control module 210, a switch fabric 220, and a group of line interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 105. For example, system control module 210 may communicate with other networks, devices, and/or systems connected to network device 105 to exchange information regarding network topology. In an exemplary implementation, system control module 210 may include a routing engine for creating routing tables based on network topology information, creating forwarding tables based on the routing tables, and sending these tables to interfaces 230 for packet routing. System control module 210 may also include one or more static memories (e.g. read only memory (ROM)(s)), one or more dynamic memories (e.g. random access memory (RAM)(s)), one or more onboard cache(s), and/or flash memory(s) for storing data and/or machine-readable instructions.

Switch fabric 220 may include one or multiple switching planes to facilitate communication among interfaces 230 and/or system control module 210. In an exemplary implementation, a switching plane may include a single-stage switch or a multi-stage switch of crossbar elements. Switch fabric 220 may also, or alternatively, include one or more processors, one or more memories, and/or paths that permit communication among system control module 210 and interfaces 230.

Line interfaces 230 may include devices or assemblies, such as, for example, line cards, for receiving incoming packets from network links (or from other line interfaces 230) and for transmitting packets to network links (or to other line interfaces 230). For example, line interfaces 230 may include wireless and/or wireless interfaces, such as, Ethernet interfaces, optical carrier (OC) interfaces, and/or asynchronous transfer mode (ATM) interfaces. Line interfaces 230 may manage a set of input ports via which packets may be received and a set of output ports via which packets may be transmitted. Line interfaces 230 may include one or more processors, one or more memories, and/or other forms of logic and/or hardware.

Depending on the implementation, the components that are illustrated in FIG. 2 may provide fewer or additional functionalities. For example, if network device 105 performs an Internet Protocol (IP) data unit routing function as part of a MPLS router, system control module 210 may perform tasks associated with obtaining routing information from other routers in a MPLS network. In such cases, conveying network traffic from one interface to another may involve label-based routing, rather than IP address-based routing.

Network device 105 may perform processes related to routing and/or switching. According to an exemplary implementation, network device 105 may perform these processes in response to system control module 210 executing sequences of instructions contained in a computer-readable medium. For example, software instructions may be read into a memory from another computer-readable medium or from another device via interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software. The term "computer-readable medium" is intended to be broadly interpreted to include a memory, a secondary storage, a compact disc (CD), a digital versatile disc (DVD), or the like. The computer-readable medium may correspond to, for example, a physical memory device or a logical memory device. A logical memory device may include memory space within a single physical memory device or spread across multiple physical memory devices.

Although, FIG. 2 illustrates exemplary components of network device 105, in other implementations, network device 105 may include additional components, fewer components, different components, and/or differently arranged components than those illustrated in FIG. 2 and described herein. Additionally, or alternatively, one or more operations described as being performed by a particular component of network device 105 may be performed by one or more other components, in addition to or instead of the particular component.

Exemplary Line Interface Architecture

Figure 3A:
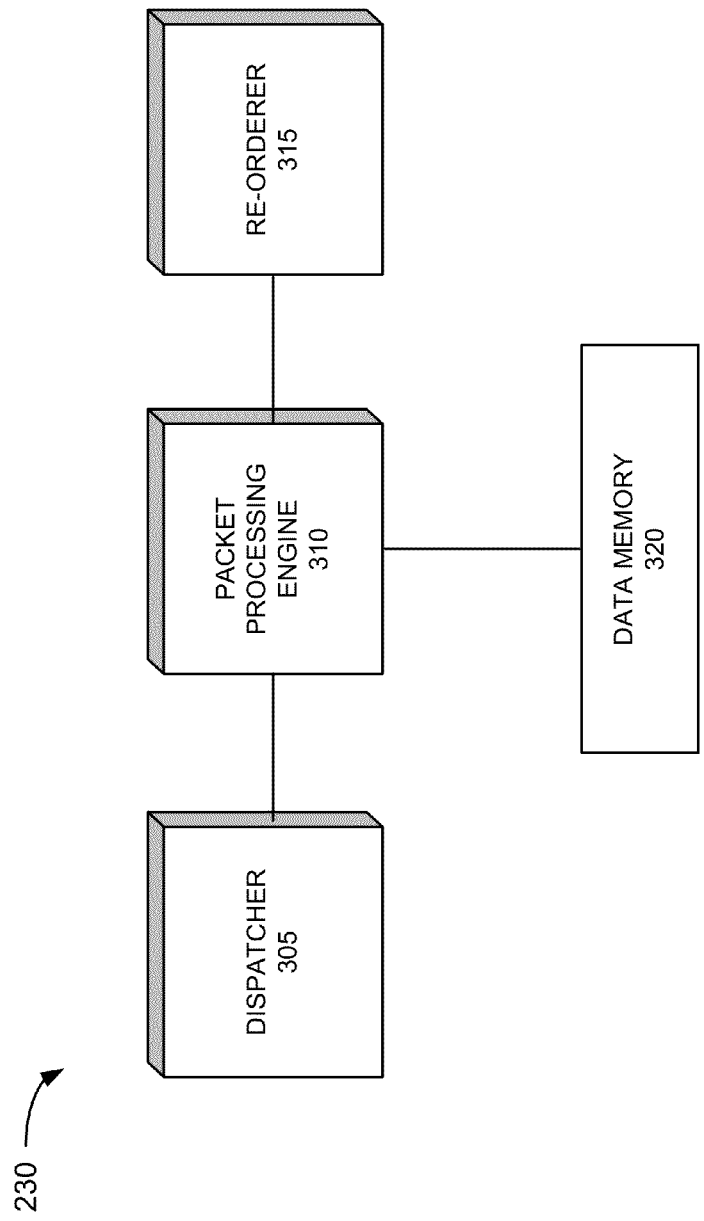
FIG. 3A is a diagram illustrating exemplary functional components of an exemplary line interface depicted in FIG. 2.

FIG. 3A is a diagram illustrating exemplary functional components of an exemplary line interface 230 depicted in FIG. 2. The functional components illustrated in FIG. 3A may be implemented by hardware (e.g., one or more processors or other processing logic) or a combination of hardware and software. As illustrated, line interface 230 may include a dispatcher 305, a packet processing engine (PPE) 310, a re-orderer 315, and a data memory 320.

Dispatcher 305 may serve packets to PPE 310. Dispatcher 305 may store the packets in a memory associated with PPE 310. Dispatcher 305 may receive an indication (e.g., a signal) from re-orderer 315 that the packets have been processed by PPE 310. Dispatcher 305 may re-utilize resources for other incoming packets based on this indication.

PPE 310 may provide for input processing, route lookup, and output processing of the packets. PPE 310 may consult data memory 320 to perform routing lookups, classification of packets (e.g., for security purposes), policy-based routing, quality of service (QoS) routing, filtering of packets, and other forms of packet processing (e.g., packet statistical processing, accounting, and/or encapsulation). In an exemplary implementation, PPE 310 may perform one or more packet processing operations (e.g., packet parsing, route lookup, packet rewriting, nexthop determinations, K-Tree determinations, and/or firewall determinations) based on microinstructions. The microinstructions may be generated by compiling source code for an application or part of an operation system (OS), such as, for example, Juniper Operating System (JUNOS), Cisco Internet Operating System (IOS), and the like. PPE 310 may execute the microinstructions in one or more processes or threads.

Re-orderer 315 may retrieve the packets from a memory associated with PPE 310 if the PPE processes are completed. Re-orderer 315 may manage the order of the packets when the packets are associated with a same packet flow (i.e., data flow). Re-orderer 315 may pass the packets for output by network device 105.

Data memory 320 may store various types of data related to packet processing. For example, data memory 320 may store a forwarding information base (FIB), a K-tree (e.g., a binary tree for route lookup), hash table data structures, counters, routing policies, and/or instruction sets (e.g., nexthop instruction sets, K-tree instruction sets, etc.).

Although FIG. 3A illustrates exemplary functional components of an exemplary line interface 230, in other implementations, line interface 230 may include fewer functional components, additional functional components, and/or different functional components than those depicted in FIG. 3A and described herein. Additionally, or alternatively, one or more functional components of line interface 230 may perform one or more other tasks described as being performed by one or more other functional components of line interface 230. Additionally, dispatcher 305, PPE 310, re-orderer 315, and/or data memory 320 may be implemented in a component other than line interface 230.

Exemplary Split and Merge Architectures

As previously described, when a split of a virtual chassis occurs, network devices 105 associated with the split portions may determine if it may operate as the functioning virtual chassis. As described above, in an exemplary implementation, network devices 105 may determine whether the split portion satisfies at least one of the following criteria: (1) if the split portion includes both master device 130 and backup device 135; (2) if the split portion includes master device 130 and a size of the split portion is more than half a maximum size of the virtual chassis; or (3) if the split portion includes backup device 135 and a size of the split portion is at least half the maximum size of the virtual chassis. In an exemplary implementation, only one of the split portions may operate as the functioning virtual chassis. Additionally, it is possible that no split portion is permitted to operate as the functioning virtual chassis given particular split portions.

After a split occurs, the split portions may merge back together to form a virtual chassis. Network devices 105 may determine whether the merged split portions may operate as a functioning virtual chassis or a nonfunctioning virtual chassis based on the previously described criteria.

Figure 3B:
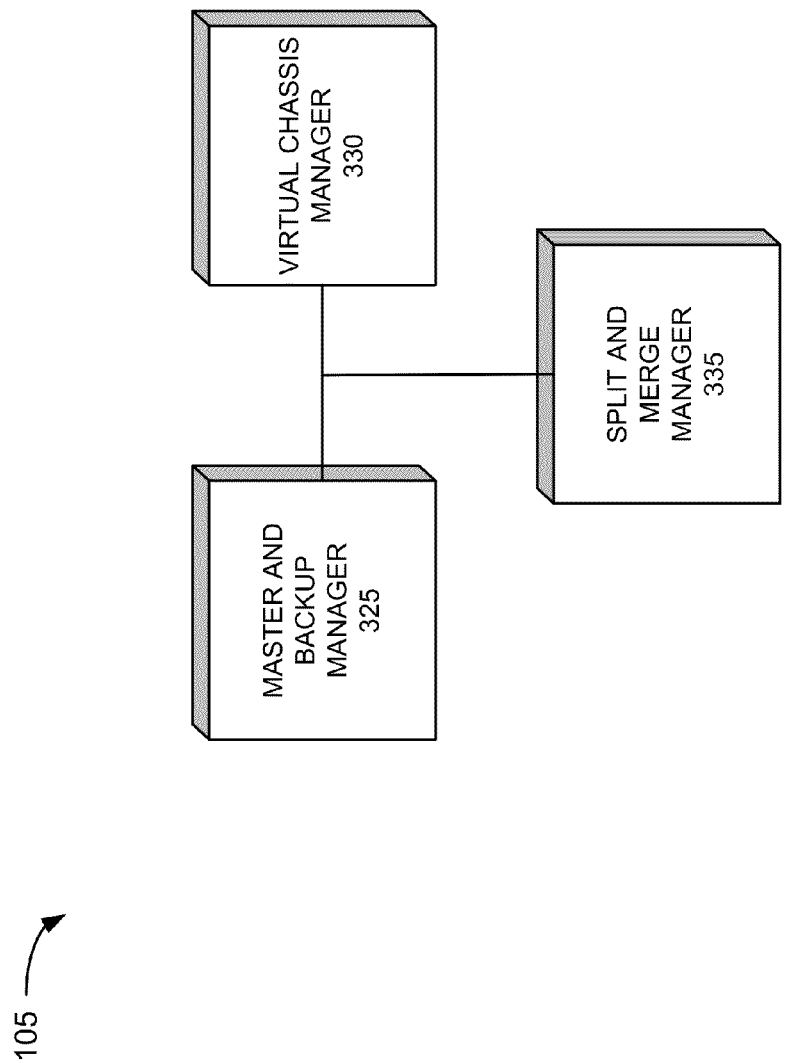
FIG. 3B is a diagram illustrating exemplary functional components of an exemplary split and merge architecture.

FIG. 3B is a diagram illustrating exemplary functional components of an exemplary split and merge architecture. As illustrated in FIG. 3B, network device 105 may include a master and backup manger 325, a virtual chassis manager 330, and a split and merge manager 335. The functional components illustrated in FIG. 3B may be implemented based on the components illustrated in FIG. 3A and described herein. For example, one or more of the functional components may be implemented by hardware (e.g., one or more processors or other processing logic) or a combination of hardware and software. While a particular number and arrangement of functional components are illustrated in FIG. 3B, in other implementations, network device 105 may include fewer functional components, additional functional components, different functional components, or differently arranged functional components than those illustrated in FIG. 3B and described herein.

Referring to FIG. 3B, master and backup manager 325 may perform master device election and backup device election processes, identify an elected master device of a virtual chassis, and identify an elected backup device of a virtual chassis.

Virtual chassis manager 330 may recognize a number associated with network devices 105 in a virtual chassis. For example, referring back to FIG. 1B, virtual chassis manager 330 may recognize that there are three network devices associated with split 140-2. Virtual chassis manager 330 may store a value corresponding to the recognized number of network devices in the virtual chassis (i.e., split 140-2). Additionally, virtual chassis manager 330 may also recognize a maximum size of a virtual chassis. For example, referring back to FIG. 1A, virtual chassis manager 330 may recognize that virtual chassis 115 includes six network devices 105 (i.e., the original number of network devices associated with the original virtual chassis).

Split and merge manager 335 may perform a split and perform a merge. For example, with respect to performing a split, split and merge manager 335 may recognize a failure (e.g., a network device 105 failure or a link failure (e.g., virtual chassis cable 125) in a virtual chassis. For example, split and merge manager 335 may detect a network topology change. Based on the detected failure and/or the network topology change, split and merge manager 335 may execute a split to form split portions (e.g., splits 140-1 and 140-2).

Additionally, split and merge manager 335 may recognize when the failure has been corrected. For example, split and merge manager 335 may detect a network topology change. Based on the detected correction and/or the network topology change, split and merge manager 335 may execute a merge.

Split and merge manager 335 may form two or more split portions (i.e., two or more virtual chassis). Split and merge manager 335 may determine whether its portion of the split of the virtual chassis may operate as a functioning virtual chassis or a nonfunctioning virtual chassis. In an exemplary implementation, split and merge manager 335 may determine whether a split portion satisfies at least one of the following criteria: (1) if the split portion includes both master device 130 and backup device 135; (2) if the split portion includes master device 130 and a size of the split portion is more than half a maximum size of the virtual chassis; or (3) if the split portion includes backup device 135 and a size of the split portion is at least half the maximum size of the virtual chassis. Based on this determination, split and merge manager 335 may instruct network devices 105 associated with the split portion to operate as a functioning virtual chassis or a non-functioning virtual chassis.

As previously described, with respect to performing a merge, in an exemplary implementation, split and merge manager 335 may determine whether merged split portions may operate as a functioning virtual chassis or a nonfunctioning chassis based on the previously described criteria.

FIGS. 3C-3H are diagrams illustrating exemplary processes associated with the exemplary functional components illustrated in FIG. 3B and described herein.

Figure 3C:
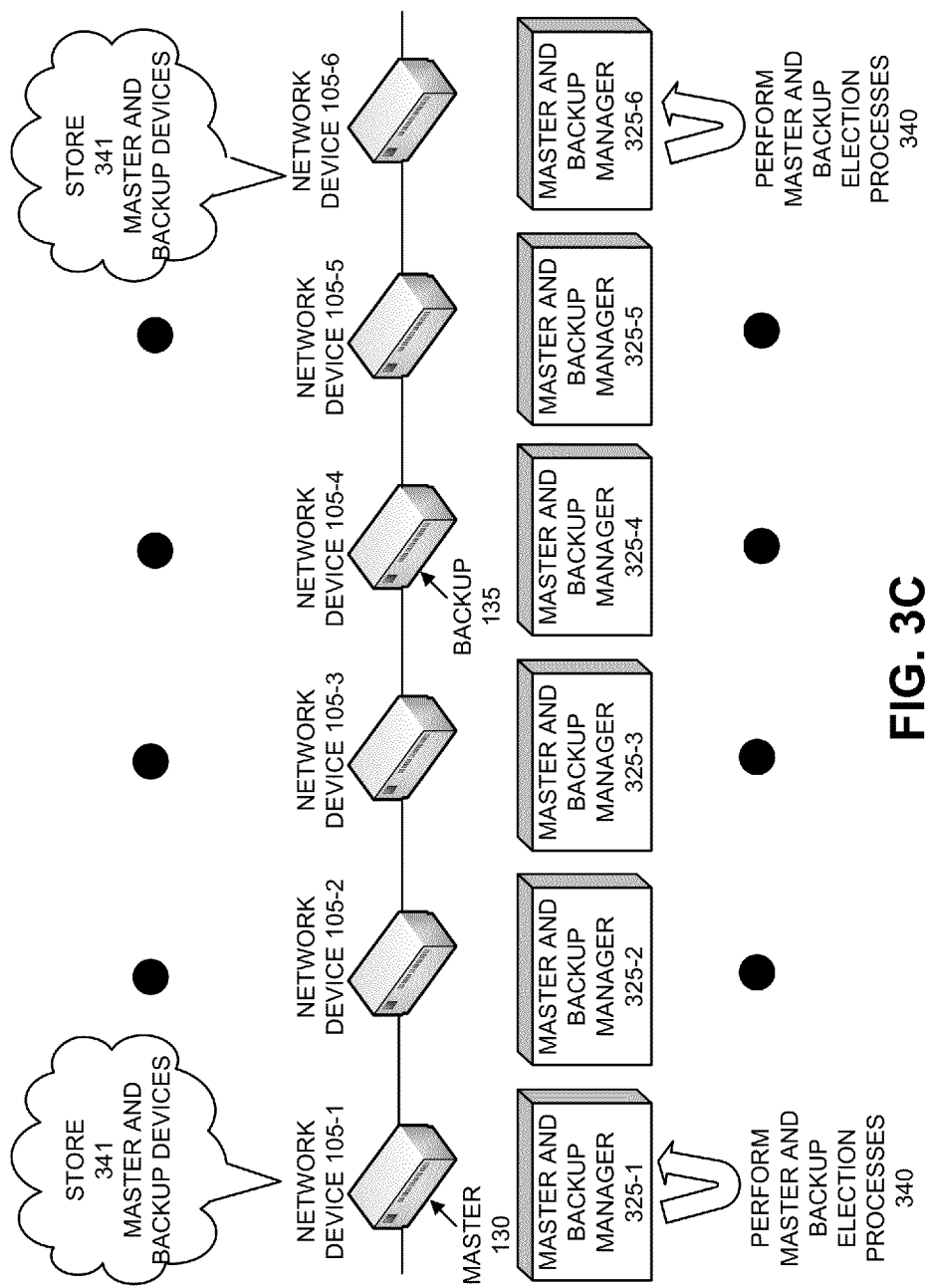

FIG. 3C is a diagram illustrating an exemplary initialization process associated with a forming of a virtual chassis. For example, during an initialization process, master and backup managers 325 of network devices 105 may perform master election and backup election processes 340. Master and backup managers 325 may elect master device 130 and backup device 135 based on the master and backup elections. Master and backup managers 325 may store 341 the network devices 105 elected (or designated) as master device 130 and backup device 135. For example, master and backup managers 325 may store network addresses associated with the elected master device 130 and backup device 135.

In an exemplary implementation, master device 130 may manage the member network devices 105 and may represent the member network devices 105 interconnected within the virtual chassis configuration (e.g., a hostname and other properties that may be assigned during setup of the virtual chassis configuration). In an exemplary implementation, backup device 135 may maintain a state of readiness to take over the master role if master device 130 fails. For example, backup device 135 may synchronize with master device 130 in terms of protocol states, forwarding tables, etc., so that backup device 135 is prepared to preserve routing information and maintain network connectivity.

Figure 3D:
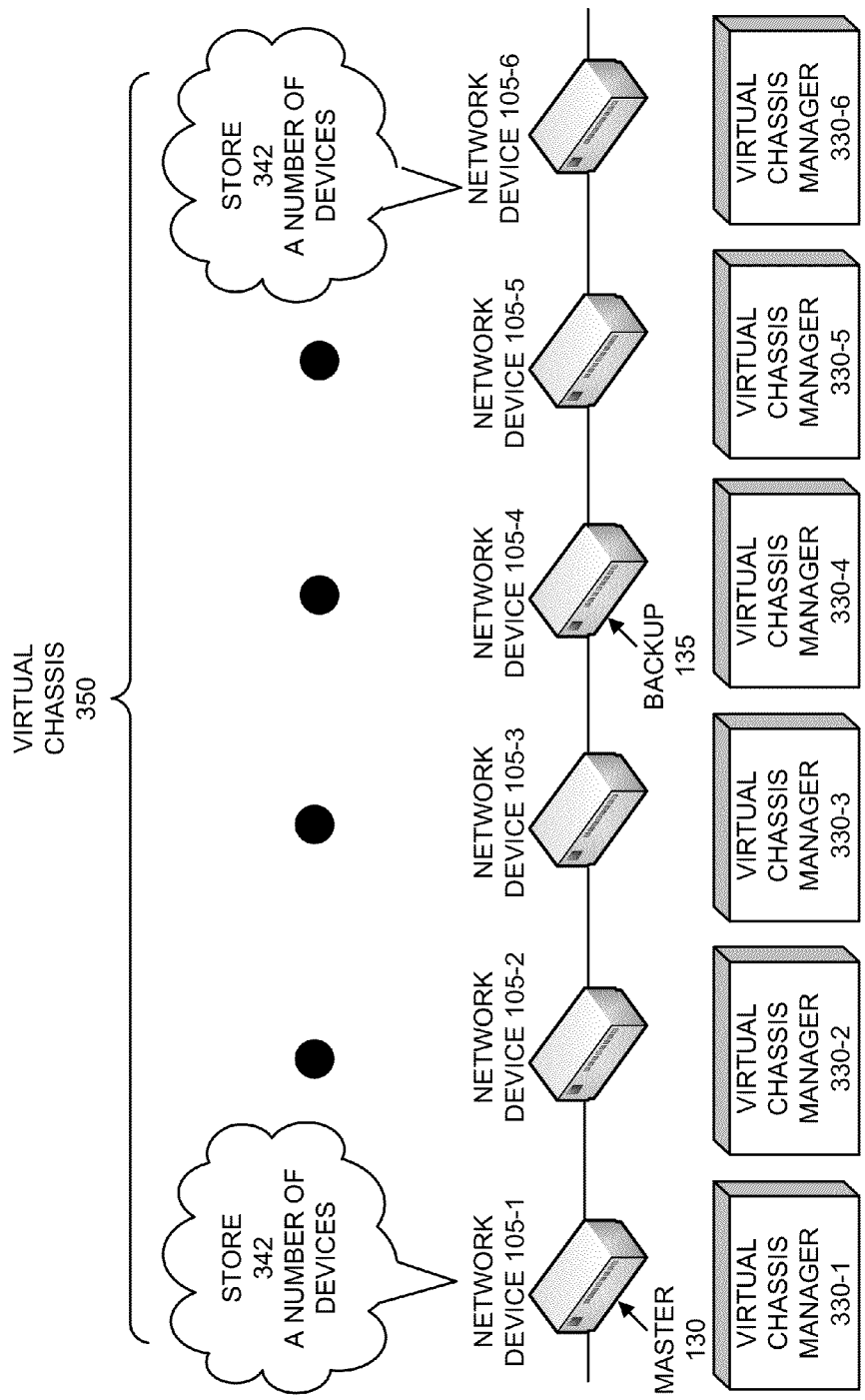

FIG. 3D is a diagram illustrating an exemplary process associated with the forming of the virtual chassis. For example, during an initialization process, virtual chassis managers 330 may store 342 a maximum size of virtual chassis 350. In this example, the maximum size of a virtual chassis 350 formed is six.

FIG. 3E is a diagram illustrating an exemplary process associated with a split occurrence. For example, split and merge managers 335 may detect a failure (e.g., a link failure or a network device 105 failure) of one of the network devices 105 in virtual chassis 350. In this example, assume that network device 105-4, which happens to correspond to backup device 135, fails (illustrated as an X). Split and merge managers 335 may detect a network topology change associated with the failure of network device 105-4. Split and merge managers 335 may execute 345 split processes. For example, split and merge managers 335 may execute a split in which network devices 105-1, 105-2, and 105-3 form a split 350-1, and network devices 105-5 and 105-6 form a split 350-2 (referred to generally as splits 350 or split 350). Additionally, master and backup managers 325 within splits 350 may execute 346 master and backup election processes. A new master device 130 may be selected for each split 350 based on these master election processes. For example, network device 105-1 may be elected as new master device 130-1 for split 350-1 and network device 105-5 may be elected as new master device 130-2 for split 350-2. Although not illustrated, new backup devices 135 may be elected for each of splits 350.

Figure 3F:
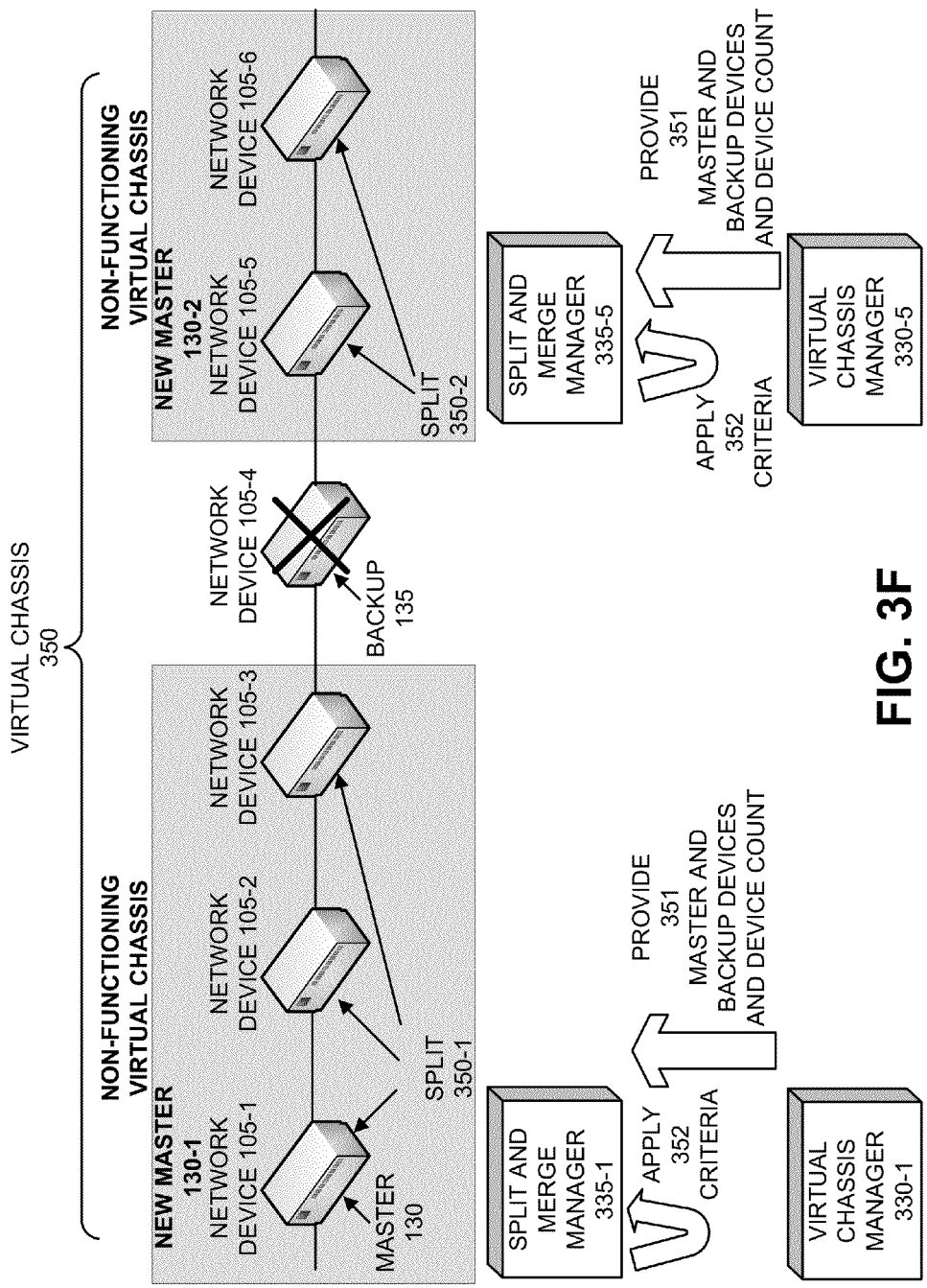

FIG. 3F is a diagram illustrating an exemplary process associated with determining whether one of the split portions of virtual chassis 350 may operate as a functioning virtual chassis. In an exemplary implementation, new master devices 130-1 and 130-2 associated with splits 350-1 and 350-2 may apply the criteria to determine whether splits 350-1 or splits 350-2 may operate as a functioning virtual chassis. For example, virtual chassis managers 330-1 and 330-5 may provide 351 identifications of network devices 105 that act(ed) as master device 130 and backup device 135 to split and merge managers 335-1 and 335-5. Virtual chassis managers 330-1 and 330-5 may also provide 351 a total number of network devices 105 that were associated with virtual chassis 350 (e.g., six) to split and merge managers 335-1 and 335-5 and the number of network devices 105 in split portions 350.

Split and merge managers 335-1 and 335-5 may apply 352 the criteria to determine whether one of split 350-1 or split 350-2 satisfies at least one of the criteria to operate as a functioning virtual chassis. In this example, split and merge managers 335 may apply the following criteria: (1) if the split portion includes both master device 130 and backup device 135; (2) if the split portion includes master device 130 and a size of the split portion is more than half a maximum size of virtual chassis 350; or (3) if the split portion includes backup device 135 and a size of the split portion is at least half the maximum size of virtual chassis 350. In view of this criteria and splits 350-1 and 350-2, split and merge managers 335 may determine that the network devices 105 associated with split 350-1 or with split 350-2 may not operate as functioning virtual chassis. In particular, split and merge manager 335-1 may determine that the network devices 105 associated with split 350-1 may not operate as a functioning virtual chassis because split 350-1 includes a master device 130, but the size of split 350-1 is not more than half of the maximum size of virtual chassis 350. Thus, network devices 105 associated with split 350-1 and network devices 105 associated with split 350-2 may operate as non-functioning chassis. As previously described, the nonfunctioning virtual chassis may operate in a pass-through mode.

FIG. 3G illustrates an exemplary process associated with a merge. For example, assume that split and merge managers 335 associated with splits 350-1 and 350-2 wish to merge because network device 105-4 is operating again. In an exemplary implementation, network devices 105 may execute a shortest-path-first (SPF) algorithm to compute a network topology in view of network device 105-4 operating again. Additionally, master and backup managers 325 may execute 361 the master and backup election processes. In this example, assume that network device 105-1 of split 350-1 is selected as new master device 130 and network device 105-4 is selected as new backup device 135. Further, it may be assumed that split and merge managers 335 may execute a merge between splits 350 to form a virtual chassis.

Figure 3H:
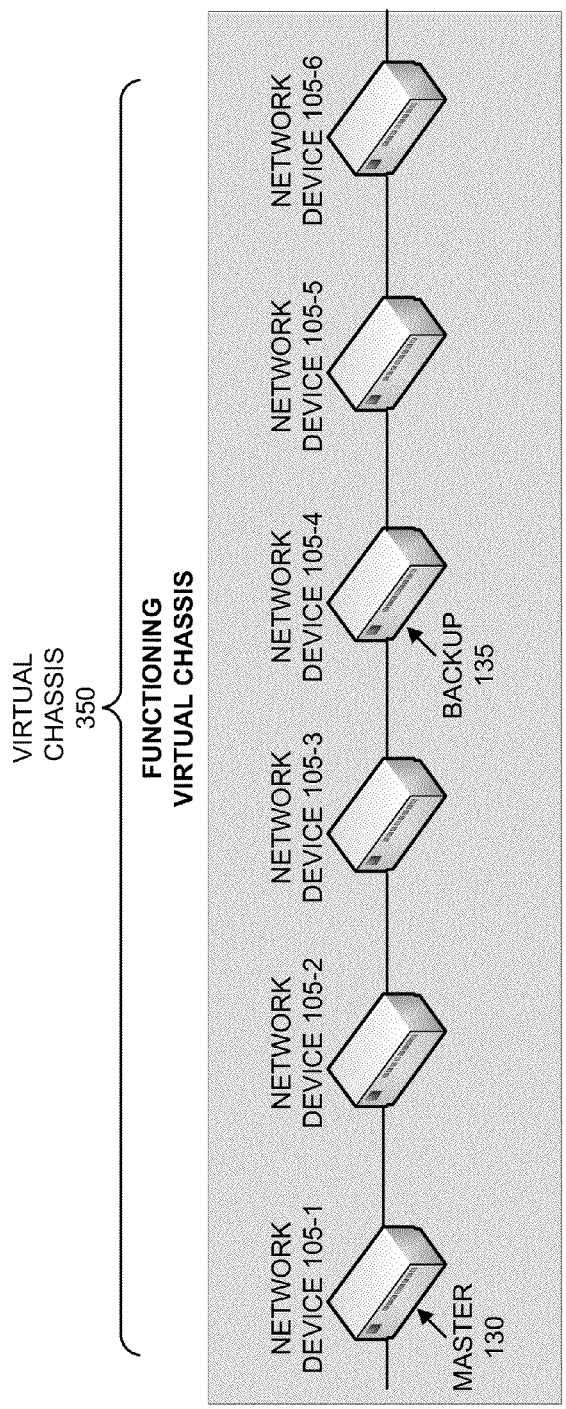

In an exemplary implementation, split and merge manager 335-1 of new master device 130 may determine whether, as merged, it may operate as a functioning virtual chassis. For example, split and merge manager 335-1 may apply 362 the criteria previously described to determine whether, as merged, the virtual chassis may operate as a functioning virtual chassis or a nonfunctioning virtual chassis. In view of this criteria and splits 350-1 and 350-2, split and merge manager 335-1 may determine that the virtual chassis (e.g., virtual chassis 350) may operate as a functioning virtual chassis, as illustrated in FIG. 3H.

Although FIGS. 3C-3H illustrate exemplary processes associated with the exemplary split and merge architecture, in other implementations, additional processes, fewer processes, and/or different processes may be utilized.

Examplary Process

Figure 4:
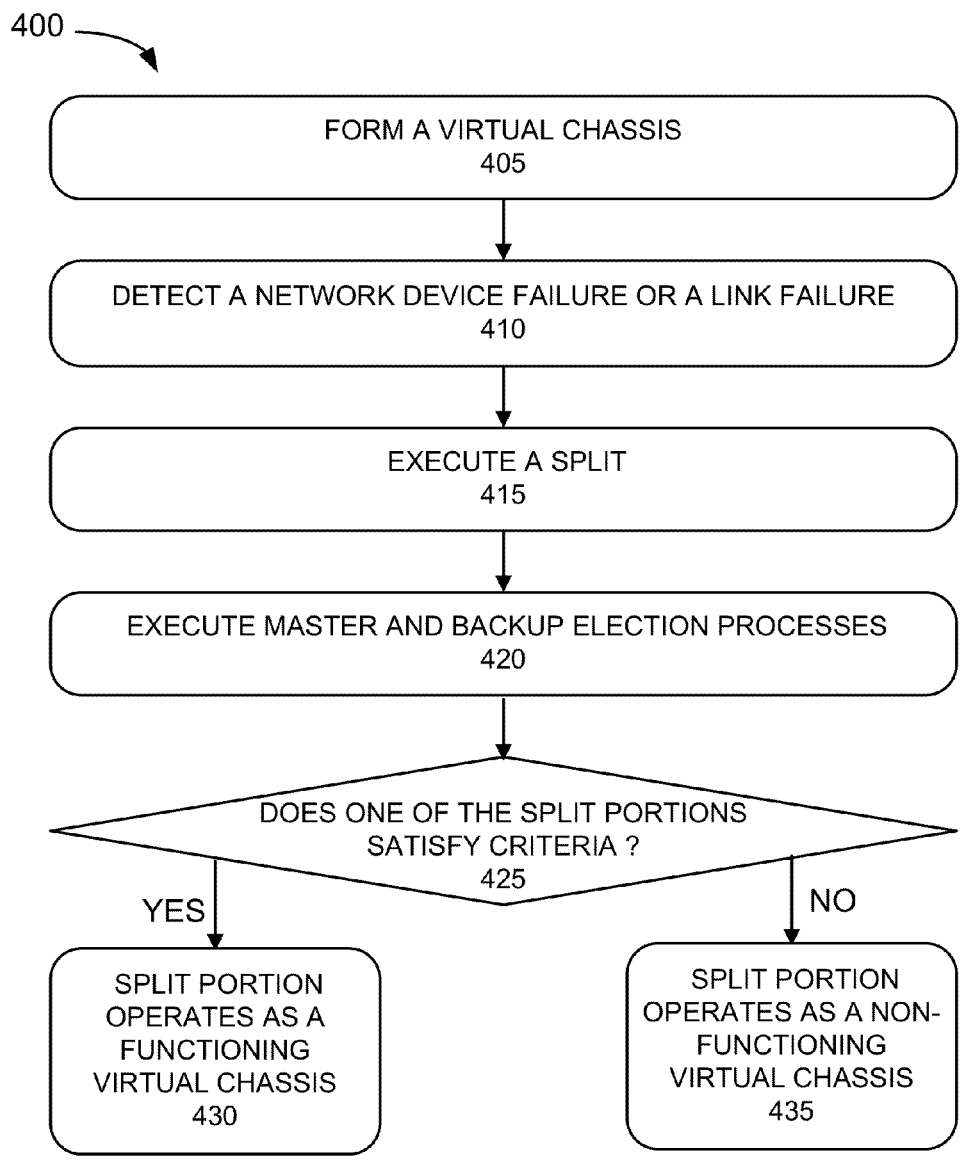
FIG. 4 is a flow diagram illustrating an exemplary process for managing a split within a virtual chassis.

FIG. 4 is a flow diagram illustrating an exemplary process 400 for managing a split within a virtual chassis. Process 400 may be performed by one or more of network devices 105 of a virtual chassis.

Process 400 may include forming a virtual chassis (block 405). For example, network devices 105 may form a virtual chassis. The virtual chassis may operate as a single logical device. Master and backup managers 325 associated with network devices 105 may select a master device and a backup device (e.g., master device 130 and backup device 135). As described herein, in an exemplary implementation, the master device may manage the member network devices 105 forming the virtual chassis. The backup device may serve as a backup mechanism for the master device in case the master device fails. The backup device may synchronize with the master device in terms of protocol states, forwarding tables, etc. In an exemplary implementation, virtual chassis 350 may store a maximum size of the virtual chassis and may recognize a number of devices in the virtual chassis.

A network device failure or a link failure may be detected (block 410). For example, split and merge manager 335 may detect a failure (e.g., a network device failure or a link failure). By way of example, split and merge manager 335 may detect when one or more network devices 105 of the virtual chassis are not operating properly (e.g., a software crash, hardware malfunction, etc.), when virtual chassis cable 125 fails, or both. Split and merge manager 335 may detect a network topology change.

A split may be executed (block 415). For example, split and merge manager 335 may execute a split between network devices 105 that form the virtual chassis. Split and merge managers 335 may execute split processes based on the topology change. For example, split and merge managers 335 may execute a split in which network devices 105 may form split portions (e.g., splits 350).

Master and backup election processes may be executed (block 420). For example, master and backup managers 325 within the split portions may execute master and backup election processes. A new master device may be selected within each split portion based on a master election process. Additionally, a new backup device may be elected for each split portion based on a backup election process.

It may be determined whether one of the split portions satisfies criteria (block 425). For example, new master devices associated with the split portions may apply criteria to determine whether one of the split portions may operate as a functioning virtual chassis. For example, virtual chassis managers 330 may provide identifications of network devices 105 that act as master device 130 and backup device 135 to split and merge managers 335. As previously described, in an exemplary implementation, master device 130 and backup device 135 may correspond to network devices 105 that were elected as master device and backup device in block 405. Virtual chassis managers 330 may also provide a total number of network devices 105 that are associated with the split portions and a maximum size of the original virtual chassis before the split (e.g., virtual chassis 350).

In an exemplary implementation, split and merge managers 335 may apply the following criteria: (1) if the split portion includes both master device 130 and backup device 135; (2) if the split portion includes master device 130 and a size of the split portion is more than half a maximum size of the original virtual chassis (e.g., virtual chassis 350); or (3) if the split portion includes backup device 135 and a size of the split portion is at least half the maximum size of the original virtual chassis. If the split portion satisfies at least one of the above-mentioned criteria, the split portion may operate as a functioning virtual chassis, otherwise, the split portion may operate as a nonfunctioning virtual chassis.

If it is determined that one of the split portions satisfies the criteria (block 425-YES), the split portion may operate as a functioning virtual chassis (block 430). For example, split and merge manager 335 may instruct network devices 105 associated with the split portion to operate according to a configuration associated with the original virtual chassis.

If it is determined that one of the split portions does not satisfy the criteria (block 425-NO), the split portion may operate as a nonfunctioning virtual chassis (block 435). For example, split and merge manager 335 may instruct network devices 105 associated with the split portion to operate in a pass-through mode.

Although FIG. 4 illustrates an exemplary process 400, in other implementations, additional operations, fewer operations, and/or different operations than those illustrated in FIG. 4 and described may be performed.

Exemplary Process

Figure 5:
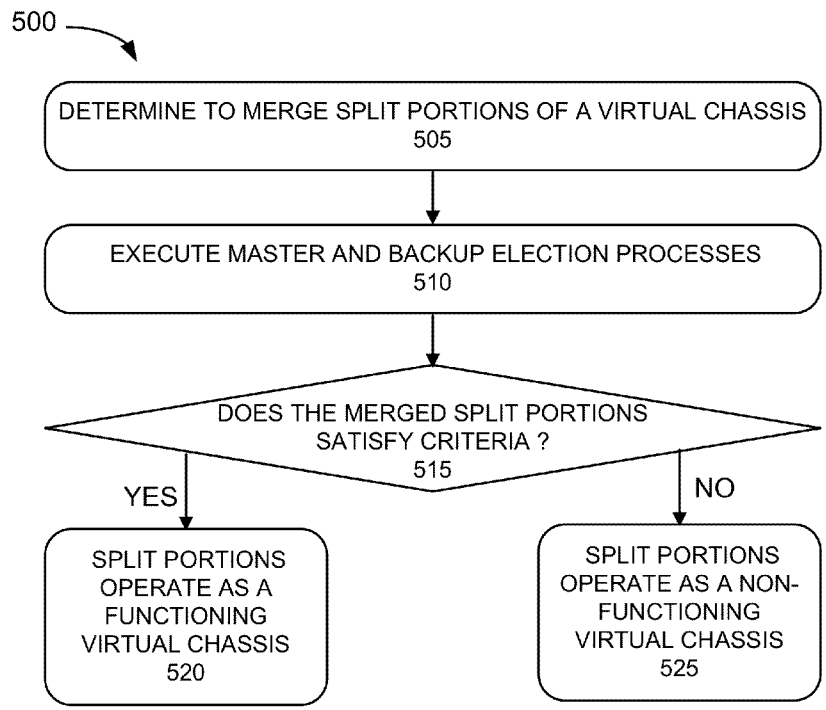
FIG. 5 is a flow diagram illustrating an exemplary process for managing a merge within a virtual chassis.

FIG. 5 is a flow diagram illustrating an exemplary process 500 for managing a merge between split portions of a virtual chassis. Process 500 may be performed by one or more network devices 105 of a virtual chassis.

Process 500 may include determining to merge split portions of a virtual chassis (block 505). For example, split and merge managers 335 associated with the split portions may wish to merge because a failure that caused a split has been corrected. For example, split and merge managers 335 may detect a network topology change. In an exemplary implementation, network devices 105 may execute a shortest-path-first (SPF) algorithm to compute a network topology in view of the detected network topology change.

Master and backup election processes may be executed (block 510). For example, master and backup managers 325 associated with the split portions may execute master and backup election processes. Master and backup managers 325 associated with network devices 105 may select a master device and a backup device (e.g., master device 130 and backup device 135). As described herein, in an exemplary implementation, the master device may manage the member network devices 105 forming the virtual chassis. The backup device may serve as a backup mechanism to the master device in case the master device fails. The backup device may synchronize with the master device in terms of protocol states, forwarding tables, etc. Split and merge managers 335 may merge the split portions to form a virtual chassis.

It may be determined whether the merged split portions satisfy criteria (block 515). For example, the elected master device associated with the split portions may apply criteria to determine whether one of the split portions may operate as a functioning virtual chassis. For example, virtual chassis manager 330 may provide identifications of network devices 105 that act(ed) as master device 130 and backup device 135 to split and merge manager 335. Virtual chassis manager 330 may also provide a total number of network devices 105 that were associated with the original virtual chassis and the number of network devices 105 in the newly formed virtual chassis.

In an exemplary implementation, split and merge manager 335 may apply the following criteria, in which the split portion corresponds to the newly formed virtual chassis: (1) if the split portion includes both master device 130 and backup device 135; (2) if the split portion includes master device 130 and a size of the split portion is more than half a maximum size of virtual chassis 350; or (3) if the split portion includes backup device 135 and a size of the split portion is at least half the maximum size of virtual chassis 350. If split and merge manager 335 determines that the split portion satisfies at least one of the criteria, then the split portion may operate as a functioning virtual chassis. Otherwise, the split portion may operate as a nonfunctioning virtual chassis.

If it is determined that the merged split portions satisfy the criteria (block 515-YES), the merged split portions may operate as a functioning virtual chassis (block 520). For example, split and merge manager 335 may instruct network devices 105 associated with the merged split portions (i.e., the newly formed virtual chassis) to operate according to a configuration associated with the original virtual chassis (i.e., as a functioning virtual chassis).

If it is determined that the merged split portions do not satisfy the criteria (block 515-NO), the merged split portions may operate as a nonfunctioning virtual chassis (block 525). For example, split and merge manager 335 may instruct network devices 105 associated with the merged split portions (i.e., the newly formed virtual chassis) to operate in a pass-through mode (i.e., as a nonfunctioning virtual chassis).

Although FIG. 5 illustrates an exemplary process 500, in other implementations, additional operations, fewer operations, and/or different operations than those illustrated in FIG. 5 and described may be performed.

Conclusion

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIG. 4 and FIG. 5, the order of the blocks may be modified in other implementations. Further, non-dependent blocks may be performed in parallel.

Also, certain aspects have been described as being implemented as "logic" or a "component" that performs one or more functions. This logic or component may include hardware, such as, for example, one or more processors, microprocessors, ASICs, or FPGAs, or a combination of hardware and software, such as, for example, one or more processors, microprocessors, ASICs, or FPGAs executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
    determining, by one or more devices, a first size of a first virtual chassis;
    determining, by the one or more devices, a second size of a second virtual chassis;
    determining, by the one or more devices, that a particular condition is satisfied based on the first size and the second size;
    determining, by the one or more devices, that the first virtual chassis is able to operate as a functioning virtual chassis based on the particular condition being satisfied; and
    providing, by the one or more devices, one or more instructions for the first virtual chassis to operate based on configurations associated with the second virtual chassis after determining that the first virtual chassis is able to operate as the functioning virtual chassis.

2. The method of claim 1, where the first virtual chassis is a portion of the second virtual chassis.

3. The method of claim 2, where the first virtual chassis includes the one or more devices.

4. The method of claim 1, further comprising:
    detecting a failure associated with the second virtual chassis; and
    splitting the second virtual chassis into the first virtual chassis and a third virtual chassis.

5. The method of claim 1, further comprising:
    selecting one of the one or more devices as a master device, of the first virtual chassis, based on a master selection process; and
    selecting another one of the one or more devices as a backup device, of the first virtual chassis, based on a backup selection process.

6. The method of claim 1, where the particular condition is satisfied when the first size is equal to or greater than half of the second size.

7. The method of claim 1, further comprising:
    determining that a third virtual chassis is able to operate as a nonfunctioning virtual chassis; and
    providing one or more different instructions for the third virtual chassis to operate as the nonfunctioning virtual chassis by operating in a pass-through mode after determining that the third virtual chassis is able to operate as the nonfunctioning virtual chassis.

8. A system comprising:
    one or more processors to:
        determine a first size associated with a virtual chassis;
        determine a second size of a portion of the virtual chassis;
        determine that a particular condition is satisfied based on the first size and the second size;
        determine that the portion is able to operate as a functioning virtual chassis based on the particular condition being satisfied; and
        instruct one or more devices associated with the portion to operate according to configurations associated with the virtual chassis.

9. The system of claim 8, where, when determining that the particular condition is satisfied, the one or more processors are to:
    determine that the second size is equal to or greater than half of the first size, and
    determine that the particular condition is satisfied based on the second size being equal to or greater than half of the first size.

10. The system of claim 8, where, when determining that the particular condition is satisfied, the one or more processors are to:
    determine that the one or more devices associated with the portion include at least one of a master device or a backup device, and
    determine that the particular condition is satisfied based on the first size and the second size and based on the one or more devices including at least one of the master device or the backup device.

11. The system of claim 8, where the one or more processors are further to:
    detect a failure associated with the virtual chassis; and
    execute a split of the virtual chassis into the portion and one or more other portions,
        the one or more other portions including one or more different devices originally included in the virtual chassis.

12. The system of claim 8, where the one or more processors are further to:
    select a first device of the one or more devices as a first master device or a first slave device of the portion; and
    select a second device of one or more different devices, associated with a different portion of the virtual chassis, as a second master device or a second slave device of the different portion.

13. The system of claim 8, where the one or more processors are further to:
    determine that a different portion, of the virtual chassis, is only able to operate as a nonfunctioning virtual chassis; and
    instruct one or more different devices associated with the different portion to operate in a pass-through mode after determining that the different portion is only able to operate as the nonfunctioning virtual chassis.

14. A non-transitory computer-readable medium storing instructions, the instructions comprising:
 one or more instructions that, when executed by at least one processor, cause the at least one processor to:
  determine that a first virtual chassis includes at least one of a master device or a slave device;
  determine a size of the first virtual chassis;
  determine that one or more conditions are satisfied based on the first virtual chassis including at least one of the master device or the slave device and based on the size of the first virtual chassis;
  determine that the first virtual chassis is able to operate as a functioning virtual chassis based on the one or more conditions being satisfied; and
  operate the first virtual chassis based on configurations associated with a second virtual chassis after determining that the first virtual chassis is able to operate as the functioning virtual chassis.

15. The non-transitory computer-readable medium of claim 14,
 where the first virtual chassis is a portion of the second virtual chassis, and
 where the first virtual chassis includes the at least one processor.

16. The non-transitory computer-readable medium of claim 14, where the one or more instructions to determine that one or more conditions are satisfied include:
 one or more instructions that, when executed by the at least one processor, cause the at least one processor to:
  determine a maximum size of the second virtual chassis,
  determine that the size of the first virtual chassis is equal to or greater than half of the maximum size of the second virtual chassis, and
  determine that the one or more conditions are satisfied based on the first virtual chassis including the at least one of the master device or the slave device and based on the size of the first virtual chassis being equal to or greater than half of the maximum size of the second virtual chassis.

17. The non-transitory computer-readable medium of claim 14, where the one or more instructions to determine that one or more conditions are satisfied include:
 one or more instructions that, when executed by the at least one processor, cause the at least one processor to:
  determine that the first virtual chassis includes both the master device and the slave device, and
  determine that the one or more conditions are satisfied based on the first virtual chassis including both the master device and the slave device and based on the size of the first virtual chassis.

18. The non-transitory computer-readable medium of claim 14, where the instructions further include:
 one or more instructions that, when executed by the at least one processor, cause the at least one processor to:
  detect a failure associated with the second virtual chassis, and
  execute a split of the second virtual chassis into the first virtual chassis and a third virtual chassis.

19. The non-transitory computer-readable medium of claim 18, where the instructions further include:
 one or more instructions that, when executed by the at least one processor, cause the at least one processor to:
  determine that the third virtual chassis is unable to operate as the functioning virtual chassis, and
  operate the third virtual chassis in a pass-through mode after determining that the third virtual chassis is unable to operate as the functioning virtual chassis.

20. The non-transitory computer-readable medium of claim 14, where the instructions further include:
 one or more instructions that, when executed by the at least one processor, cause the at least one processor to:
  select the master device, for the first virtual chassis, based on a master selection process; and
  select the slave device, for the first virtual chassis, based on a slave selection process.

* * * * *